United States Patent [19]
Kim

[11] Patent Number: 5,917,550
[45] Date of Patent: Jun. 29, 1999

[54] CLOCK SIGNAL GENERATOR FOR COMPOSITE VIDEO SIGNAL

[75] Inventor: Young-Chul Kim, Seoul, Rep. of Korea

[73] Assignee: Samsung Electronics, Co., Ltd., Suwon, Rep. of Korea

[21] Appl. No.: 08/726,077

[22] Filed: Oct. 3, 1996

[30] Foreign Application Priority Data

Oct. 6, 1995 [KR] Rep. of Korea ............ 95-34326

[51] Int. Cl.⁶ .................. H04N 9/44; H03L 7/00
[52] U.S. Cl. ............. 348/536; 348/537; 348/540; 348/549
[58] Field of Search ............ 348/537, 505, 348/506, 511, 512, 514, 539, 542, 536, 540, 549; 386/85, 88, 13, 19; H04N 9/44; H03L 7/00

[56] References Cited

U.S. PATENT DOCUMENTS

| | | | |
|---|---|---|---|
| 4,015,288 | 3/1977 | Ebihara et al. | 348/506 |
| 4,069,499 | 1/1978 | Nimomiya | 386/19 |
| 4,647,984 | 3/1987 | Suzuki et al. | 386/19 |
| 4,847,678 | 7/1989 | McCauley | 348/537 |
| 5,025,310 | 6/1991 | Sekiya et al. | 348/537 |

*Primary Examiner*—Michael Lee
*Attorney, Agent, or Firm*—Marger Johnson & McCollum, P.C.

[57] ABSTRACT

A clock signal generator and method for generating a clock signal which is synchronized with an input composite video signal. The generator comprises a synchronizing separator for separating a horizontal synchronizing signal from an input composite video signal; a burst separator for separating a color burst signal from the input composite video signal; a phase error detector for receiving the horizontal synchronizing signal, detecting a phase error and outputting a phase error signal for a previous horizontal period; a phase change detector for receiving the color burst signal, detecting a phase change of the color burst signal, and outputting a phase change signal for a present horizontal period; an adder for adding the phase error signal and the phase change signal; and a clock signal generator for receiving an output of the adding means and generating a clock signal which is synchronized with the input composite video signal.

17 Claims, 3 Drawing Sheets

CLOCK SIGNAL GENERATOR FOR COMPOSITE VIDEO SIGNAL

BACKGROUND OF THE INVENTION

1. Field of the Invention

The present invention relates to a clock signal generator for television receivers, video tape recorders and the like, and more particularly to a clock signal generator used for generating a horizontal synchronizing signal for a composite video signal.

The present invention is based on Korean Application No. 95-34326 filed Oct. 6, 1995, which is incorporated herein by reference for all purposes.

2. Description of the Prior Art

Referring to FIG. 1 which illustrates a block diagram of a first prior art clock generator, the reference numeral 1 designates a video signal input terminal. A burst lock clock generator 4 receives an input from terminal 1 and provides a burst lock clock signal to a burst lock clock signal line 5. The burst lock clock signal is generated in synchronism with a color burst signal contained in a composite video signal applied to terminal 1. A synchronizing signal generator 9 produces a horizontal synch signal, synchronized with the burst lock clock signal, on a synchronizing signal output terminal 1. A signal processor 10, which receives the burst lock clock signal on line 5 and the video signal on terminal 1 produces a video output signal on a video signal output terminal 12.

Referring to FIG. 2 which illustrates a block diagram of a second prior art clock generator, like numerals correspond to previously identified structure. A line lock clock generator 2 receives an input from terminal 1 and provides a line lock clock signal to a line lock clock signal line 3. The line lock clock signal is generated in synchronism with a horizontal synchronizing signal contained in the composite video signal applied to terminal 1. Synchronizing signal generator 9 produces a horizontal synch signal, synchronized with the line lock clock signal, on terminal 11. Signal processor 10, which receives the line lock clock signal on line 3 and the video signal on terminal 1, produces a video output signal on a video signal output terminal 12.

Referring to FIG. 1, the burst lock clock generator 4 generates a stable burst lock clock signal on line 5 by using a crystal oscillator (not shown). The burst lock clock signal 5 is synchronized with the color burst signal contained in the input video signal supplied through video signal input terminal 1. The input video signal is a signal which is in accordance with a standard television broadcasting system (hereinafter referred to as a "standard signal"). In an NTSC system, the relation between the frequency $f_{sc}$ of the color burst signal contained in the standard signal and the frequency $f_H$ of the horizontal synchronizing signal can be expressed in the following equation:

$$f_{sc} = (455/2) f_H$$

Non-NTSC input video signals which do not satisfy the above equation are called "non-standard signals."

The synchronizing signal generator 9 receives the burst lock clock signal on line 5 supplied from the burst lock clock generator 4 and generates a horizontal synch signal using the relation expressed by the above equation.

The signal processor 10 receives both the input video signal supplied through the video signal input terminal I and the burst lock clock signal on line 5. Signal processor 10 processes the video signal by using the relation expressed by the above equation to thereby improve the image quality of the video signal. An example of such a conventional circuit for improving the image quality of the video signal is disclosed in Japanese Patent Laid-open Gazette No. 62-268274 which is incorporated by reference.

Referring now to FIG. 2, the line lock clock generator 2 generates the line lock clock signal on line 3. The signal on line 3 is synchronized with a horizontal synchronizing signal contained in an input video signal and supplied through the video signal input terminal 1.

The synchronizing signal generator 9 receives the line lock clock signal 3, supplied from the line lock clock generator 2, and generates a horizontal synch signal therefrom.

The signal processor 10 receives both the video signal supplied through the video signal input terminal 1 and the line lock clock signal on line 3 supplied from the line lock clock generator 2, and performs signal processing on the input video signal. An example of such a conventional circuit as shown in FIG. 2 is disclosed in Japanese Patent Laid-open Gazette No. 63-193783 which is incorporated by reference.

The clock generator of FIG. 1, using a burst lock method, enables one to generate a very stable synchronizing signal. More importantly, however, the image quality of a standard input video signal can be improved. However, when the input video signal is a non-standard signal, such as a video signal reproduced by a video tape recorder, it is impossible to improve the image quality because the input video signal is not accurately synchronized with the synchronizing clock signal.

The clock pulse generator of FIG. 2, using a line lock method, has an advantage in that even a non-standard input video signal can be synchronized with a clock signal to a sufficient level to improve image quality. By detecting a horizontal synchronizing signal in the input video signal, a clock signal which is synchronized with the input video signal can be generated. However, if a standard signal which does not satisfy the relation expressed by the above equation is supplied, the image quality can not be improved to a sufficient level, because accuracy of synchronization between the input video signal and the clock signal in FIG. 2 is lower than that in FIG. 1.

FIG. 3 illustrates a block diagram showing a conventional line-lock/burst-lock clock generator as disclosed in U.S. Pat. No. 5,025,310 which is incorporated herein by reference.

Referring to FIG. 3, previously used numerals identify like structure. Included therein are a video signal input terminal 1, a line lock clock generator 2, a line lock clock signal 3, a burst lock clock generator 4, a burst lock clock signal 5, a standard/non-standard signal detector 6, a phase comparator 7&, switches 8a, 8b, a synchronizing signal generator 9, a signal processor 10, a synchronizing signal output terminal 11, a video signal output terminal 12, an adder 17, a synchronizing signal separator/phase comparator 18, and a voltage-controlled oscillator 19.

A video signal is supplied through the video signal input terminal 1, to the line lock clock generator 2, to the burst lock clock generator 4, and to the standard/non-standard signal detector 6. The line lock clock generator 2 separates a horizontal synchronizing signal contained in the video signal, and generates the line lock clock signal 3 having a frequency 1820 times that of the frequency $f_H$ of the horizontal synchronizing signal. This is accomplished by using a phase-locked loop (PLL) circuit which includes the adder 17, the synchronizing signal separator/phase comparator 18, and the voltage-controlled oscillator 19.

The burst lock clock generator 4 separates a color burst signal contained in the video signal, and generates the burst lock clock signal on line 5 having a frequency of 8 times as high as the frequency $f_{sc}$ of the color burst signal. This is accomplished by using a crystal oscillator (not shown) which is provided in the burst lock clock generator 4. Since the burst lock clock signal 5 is generated by the crystal oscillator as described above, the burst lock clock signal 5 is very stable.

The synchronizing signal generator 9 receives the line lock clock signal 3, and generates a horizontal synchronizing signal of the input video signal by lowering the frequency of the line lock clock signal on line 3. This horizontal synchronizing signal is then applied to synchronizing signal output terminal 11.

The standard/non-standard signal detector 6 determines whether or not the frequency $f_H$ of the horizontal synchronizing signal of the input video signal and the frequency $f_{sc}$ of the color burst signal satisfy the relation expressed by the above equation. When the relation expressed by the above equation is satisfied, the standard/non-standard signal detector 6 determines that the input video signal is a standard signal. When the relation expressed by the above equation is not satisfied, the standard/non-standard signal detector 6 determines that the input video signal is a non-standard signal.

The switch 8a receives a detection signal supplied from the standard/non-standard signal detector 6. When the input video signal is a non-standard signal, the switch 8a is turned or closed to the line lock clock (L) side, as shown by the dotted line in FIG. 3. Alternately, when the input video signal is a standard signal, the switch 8a is turned or closed to the burst lock clock (B) side, as shown by the solid line in FIG. 3. Accordingly, either one of the line lock clock signal or the burst lock clock signal is supplied to the signal processor 10. The signal processor 10 receives the video signal from the video signal input terminal 1, and performs digital signal processing by using the clock signal supplied through the switch 8a to improve image quality. The processed video signal is then transmitted through the video signal output terminal 12.

The phase comparator 7 receives and compares the line lock clock signal 3 and the burst lock clock signal 5. The comparator 7 then supplies a signal to switch 8b corresponding to the phase difference between the line lock clock signal 3 and the burst lock clock signal 5. As with switch 8a, the operation of the interlocked switch 8b is controlled based on the detection signal generated by the standard/non-standard signal detector 6. When the input video signal is a standard signal, the switch 8b is turned to the C side so as to be closed as shown by a solid line. Alternately, when the input video signal is a nonstandard signal, the switch 8b is turned to the O side so as to be opened as shown by a dotted line. Accordingly, the switch 8b serves to supply the output signal of the phase comparator 7 to the line lock clock generator 2 only when the input video signal is a standard signal.

The line lock/burst lock clock generator constructed as mentioned above 00 eliminates the disadvantages of the circuits shown in FIGS. 1 and 2, in which a line lock method and a burst lock method are adopted, individually. However, the line lock/burst lock clock generator of FIG. 3 still has a disadvantage in that noise is generated when the input video signal changes from a standard signal to a non-standard signal or from a non-standard signal to a standard signal. That is, noise results when the line lock clock signal and the burst lock clock signal are switched by the switch 8a. Furthermore, construction of the generator shown in FIG. 3 is complicated due to addition of the standard/non-standard signal detector and switches.

SUMMARY OF THE INVENTION

Therefore, the present invention has been made in view of the above-described problems occurring in the prior art. An object of the present invention is to provide a clock signal generator and method which can generate a clock signal that is accurately synchronized with an input video signal by simultaneously using a line lock method and a burst lock method.

Another object of the present invention is to provide a clock signal generator which has a simple structure.

According to one aspect of the present invention, there is provided a method for generating a clock signal synchronized with a composite video signal having a horizontal synchronizing signal and a color burst signal, including separating the horizontal synchronizing signal from the composite video signal, separating the color burst signal from the composite video signal, detecting phase error between the horizontal synchronizing signal and a standard composite video signal, generating a phase error signal related to the detected phase error, detecting a phase change in said color burst signal, generating a phase change signal related to the detected phase change, adding the phase error signal and the phase change signal, and generating a clock signal in response to the added signals.

A clock signal generator for implementing the method of the present invention is also provided.

By the features of the present invention, the clock signal generator according to the present invention does not require additional circuits, such as a standard/non-standard signal detector and the like, and improves the image quality of the input video signal by simultaneously using a line lock method and a burst lock method to accurately synchronize an input video signal with a generated clock signal.

BRIEF DESCRIPTION OF THE DRAWINGS

The above objects, other features and advantages of the present invention will be more apparent after a reading of the following detailed description taken in conjunction with the drawings in which.

DETAILED DESCRIPTION OF THE INVENTION

Figure 1:
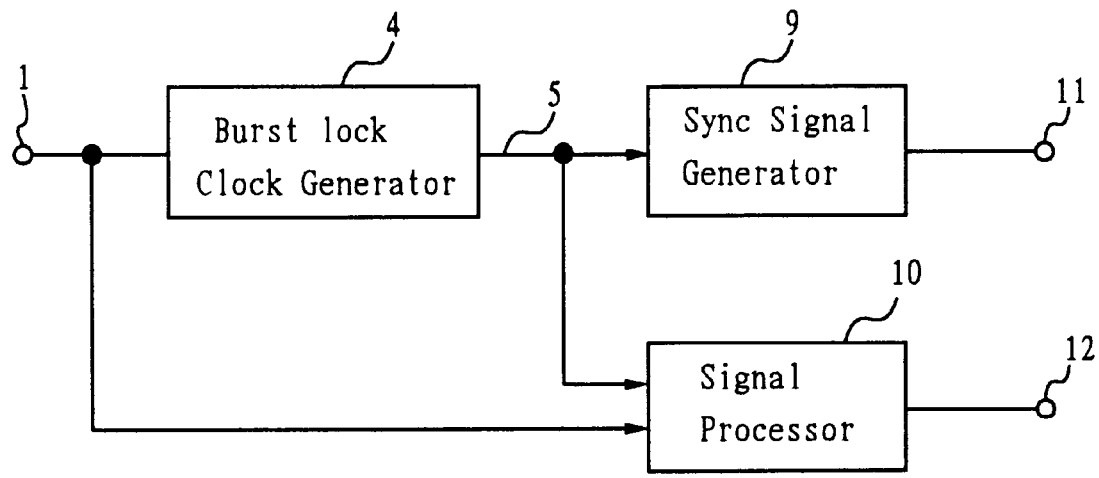
FIG. 1 is a block diagram showing a first prior art clock signal generator.
Figure 2:
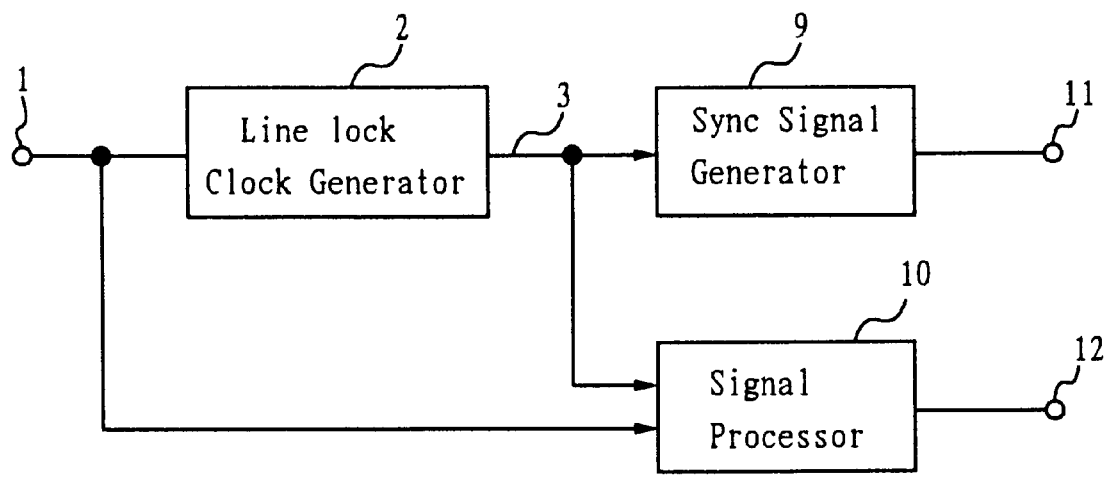
FIG. 2 is a block diagram showing a second prior art clock signal generator.
Figure 3:
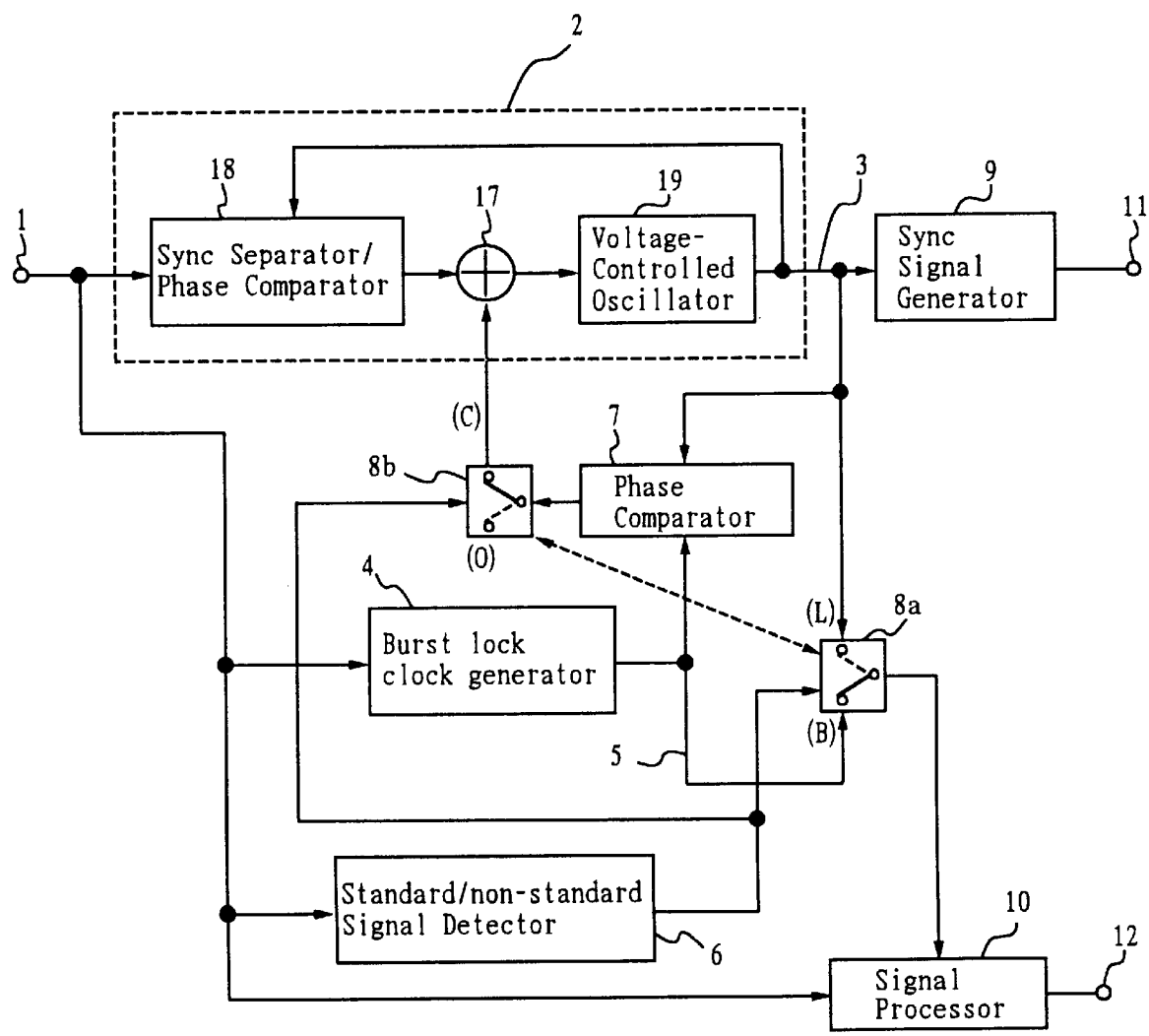
FIG. 3 is a block diagram showing a third prior art clock generator.
Figure 4:
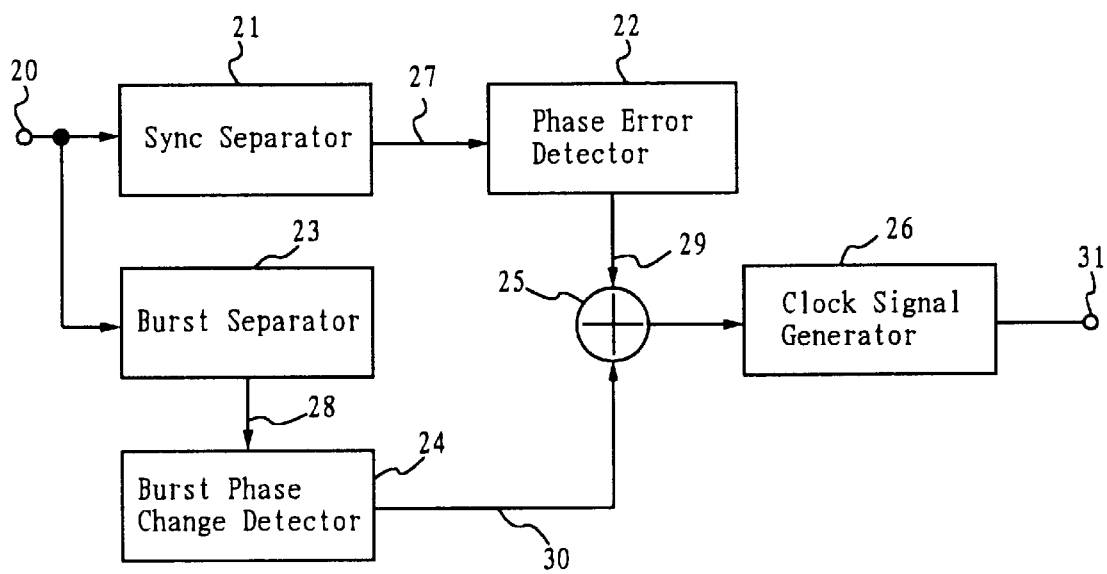
FIG. 4 is a block diagram of a clock signal generator in accordance with an embodiment of the present invention.

Hereinafter, a clock signal generator in accordance with an embodiment of the present invention will be described with reference to FIG. 4.

The clock signal generator of the present invention includes a synchronizing separator 21, a phase error detector 22, a burst separator 23, a burst phase change detector 24, an adder 25, and a clock signal generator 26. The reference numeral 20 designates a video signal input terminal, 27 a line to which a horizontal synchronizing signal is applied, 28 a line to which a color burst signal is applied, 29 a line to which a phase error signal is applied, 30 a line to which a phase change signal is applied, and 31 a clock signal output terminal.

The synchronizing separator 21 separates the horizontal synchronizing signal, on line 27, from an input composite video signal supplied through the video signal input terminal 20. The burst separator 23 separates the color burst signal, on line 28, from the input composite video signal supplied through the video signal input terminal 20. The phase error detector 22 receives the horizontal synchronizing signal on line 27 and detects a phase difference between the input composite video signal and a standard video signal. The burst phase change detector 24 detects frequency change of the color burst signal on line 28.

When the input composite video signal is a non-standard video signal, the period of the line is irregularly changed due to noise produced by various causes. Accordingly, the NTSC frequency relation equation mentioned above in the Background of the Invention cannot be satisfied.

The period change for a composite video signal applied to terminal 20 can be estimated by detecting the phase difference between the start and the end of the color burst signal. This takes into account that a typical color burst signal exists at a front portion in a line of a composite video signal. That is, if the period of a composite video signal is increased or decreased in every line, a color burst signal contained in every line of the composite video signal is also increased or decreased. Therefore, because a color burst signal exists at a front portion in a line of composite video signal applied to terminal 20, the period change of the following portion of the composite video signal can be estimated by detecting a phase change of the color burst signal.

The phase error detector 22 detects a phase difference between the previous line of composite video signal appearing on terminal 20 and the standard video signal, by using the horizontal synchronizing signal on line 27. The adder 25 adds the phase error on line 29, which is detected from the most recent horizontal synch signal and the previous horizontal synch signal, and the color burst signal detected in the most recent composite video signal. The clock pulse generator 26 receives the output signal from the adder 25 and generates a clock signal which is synchronized with the input composite video signal.

Figure 5:
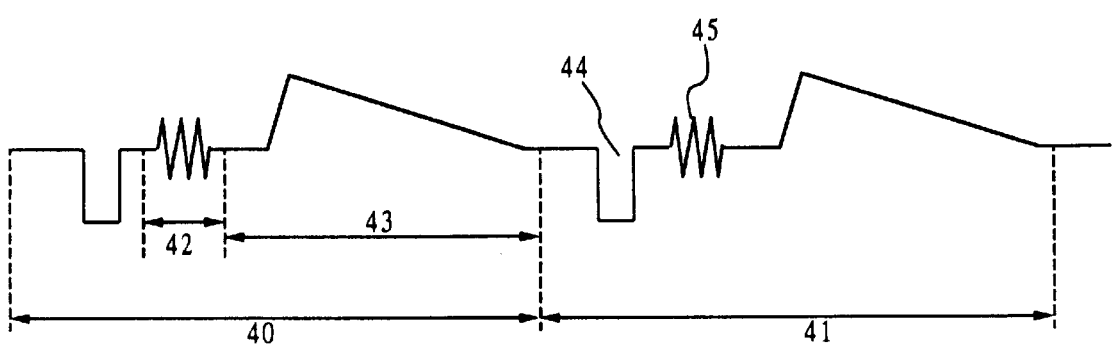
FIG. 5 is a drawing illustrating input video signals.

Referring to FIG. 5, there is illustrated a composite video signal supplied through the video signal input terminal 20. The reference numeral 40 designates a horizontal line signal previously applied to terminal 20, 41 a horizontal line signal currently applied to terminal 20, 42 and 45 color burst signals each of which is contained in horizontal line signals 40, 41, respectively, 43 an active video area contained in horizontal line signal 40, and 44 a horizontal synchronizing signal contained in horizontal line signal 41. The active video area 43 provides an active video data.

The operation of the circuit shown in FIG. 4 will be fully described in below with reference to FIG. 5.

The synchronizing separator 21 separates the horizontal synchronizing signal from the input composite video signal. The burst separator 23 separates the color burst signal 45 contained in the input composite video signal. The phase error detector 22 detects a phase error between successive horizontal synchronizing signals as a phase error for a previous horizontal period. The detected phase error is transferred to adder 25 when the horizontal synchronizing signal is separated. After the color burst signal 45 is received at terminal 20, the burst phase change detector 24 detects a phase change between the beginning and end of the color burst signal 45 which is used to evaluate phase change of the present horizontal period. The adder 25 sums up the phase change on line 30 for a present horizontal period and the phase error on line 29 for a previous horizontal period. The clock signal generator 26 receives the output signal of the adder 25, generates an average thereof, and generates the clock signal which is synchronized with the input composite video signal. The clock signal is applied to the signal processor (not shown in FIG. 4) for processing the input video signal.

Accordingly, the clock signal generator according to the present invention does not require additional circuits such as a standard/non-standard signal detector and the like, and can improve the image quality of an input video signal by simultaneously using a line lock method and a burst lock method to accurately synchronize the input composite video signal with a generated clock signal.

While the present invention has been described and illustrated with reference to a preferred embodiment thereof, it is to be readily understood that the present invention is not limited to the embodiment, and various changes and modifications can be made therein without departing from the spirit and scope of the invention defined in the appended claims.

What is claimed is:

1. A clock signal generator comprising:
    synchronizing separation means for separating a horizontal synchronizing signal from a composite video signal;
    burst separation means for separating a color burst signal from said composite video signal;
    phase error detection means for generating a phase error signal related to phase error in said horizontal synchronizing signal;
    phase change detection means for generating a phase change signal responsive to phase change in said color burst signal between a start point and an end point of the color burst signal;
    adding means for adding said phase error signal and said phase change signal, said adding means producing an output; and
    clock signal generation means for generating a clock signal synchronized with said input composite video signal responsive to said adding means output.

2. The clock signal generator of claim 1 wherein the composite video signal comprises periodic horizontal line signals each of which contains a horizontal synch pulse and wherein said phase error signal includes information relating to phase error between each succeeding horizontal synch pulse.

3. The clock signal generator of claim 1 wherein the composite video signal comprises periodic horizontal line signals each of which contains a periodic color burst signal and wherein said phase change signal includes information related to the phase change in the color burst signal in each horizontal line signal.

4. The clock signal generator of claim 3 wherein each horizontal line signal contains a horizontal synch pulse and wherein said phase error signal includes information relating to phase error between the horizontal synch pulse in the line from which the phase change signal was derived and the horizontal synch pulse in the previously occurring horizontal line signal.

5. The clock signal generator of claim 4 wherein said phase error is determined with reference to a standard composite video signal.

6. The clock signal generator of claim 1, wherein said clock signal generation means generates an average value of said adding means output and generates said clock signal in response to said average value.

7. A clock signal generator for generating a clock signal for synchronizing a composite video signal having periodic horizontal line signals each of which contains a horizontal synch pulse and a periodic color burst signal, said generator comprising:

a synchronizing separator having an input for receiving a composite video signal having a horizontal synch pulse and a periodic color burst signal, said synchronizing separator separating the horizontal synch pulses from the composite video signal and providing the pulse on an output thereof;

a phase error detector operatively connected to said synchronizing separator for receiving the horizontal synch pulse and comparing the phase thereof with the phase of a standard composite video signal, said phase error detector generating a phase error signal responsive to the phase error between the horizontal synch pulse and the standard composite video signal on an output thereof;

a color burst separator having an input for receiving the composite video signal, said color burst separator separating the color burst signals from the composite video signal and providing each color burst signal on an output thereof;

a color burst phase change detector operatively connected to said color burst separator for receiving each color burst signal and detecting the phase change thereof between a start point and an end point of the color burst signal, said color burst phase change detector generating a phase change signal related to the phase change of the color burst signals on an output thereof;

an adder operatively connected to the outputs of said phase error detector and said color burst phase change detector, said adder adding the signals on each output and producing an added signal on an output thereof; and a clock signal generator having an input operatively connected to said adder output, said clock signal generator producing a clock signal synchronized with said composite video signal.

8. The clock signal generator of claim 7 wherein said phase error signal includes information relating to phase error between each succeeding horizontal synch pulse.

9. The clock signal generator of claim 7 wherein said phase change signal includes information related to the phase change in the color burst signal in each horizontal line signal.

10. The clock signal generator of claim 9 wherein said phase error signal includes information relating to phase error between the horizontal synch pulse in the line from which the phase change signal was derived and the horizontal synch pulse in the previously occurring horizontal line signal.

11. The clock signal generator of claim 10 wherein said phase error is determined with reference to a standard composite video signal.

12. The clock signal generator of claim 7, wherein said clock signal generator generates an average value of said adder output and generates said clock signal in response to said average value.

13. A method for generating a clock signal synchronized with a composite video signal having a horizontal synchronizing signal and a color burst signal, said method comprising:

separating the horizontal synchronizing signal from the composite video signal;

separating the color burst signal from the composite video signal;

detecting phase error by comparing the horizontal synchronizing signal and a standard composite video signal;

generating a phase error signal responsive to the detected phase error;

detecting a phase change in the color burst signal between a start point and end point of said color burst signal;

generating a phase change signal responsive to the detected phase change;

adding the phase error signal and the phase change signal; and generating a clock signal in response to the added signals.

14. The method of claim 13 wherein generating a clock signal in response to the added signals comprises generating an average value of said added signals.

15. The method of claim 13 wherein the horizontal synchronizing signal includes a periodic horizontal pulse and wherein detecting phase error between the horizontal synchronizing signal and a standard composite video signal comprises detecting phase error between each succeeding horizontal pulse.

16. The method of claim 13 wherein the composite video signal comprises periodic horizontal line signals each of which contains a periodic color burst signal and wherein detecting a phase change in said color burst signal comprises detecting phase change in the color burst signal in each horizontal line signal.

17. The method of claim 16 wherein the horizontal synchronizing signal includes a periodic horizontal pulse and wherein detecting phase error between the horizontal synchronizing signal and a standard composite video signal comprises detecting phase error between each succeeding horizontal pulse.

* * * * *

UNITED STATES PATENT AND TRADEMARK OFFICE
CERTIFICATE OF CORRECTION

PATENT NO.    : 5,917,550
DATED         : June 29, 1999
INVENTOR(S)   : Young-Chul Kim It is certified that error appears in the above-identified patent and that said Letters Patent is hereby corrected as shown below:

Column 1,
Line 26, "terminal 1" should read -- terminal 11 --;
Line 45, "terminal I" should read -- terminal 1 --.

Signed and Sealed this

Twenty-first Day of May, 2002

Attest:

JAMES E. ROGAN
Attesting Officer      Director of the United States Patent and Trademark Office